(12) United States Patent
Ho et al.

(10) Patent No.: US 12,659,199 B2
(45) Date of Patent: Jun. 16, 2026

(54) DIFFERENTIAL SIGNAL SKEW COMPENSATION TECHNIQUE FOR RFI MITIGATION WITH NO REFLECTION PENALTY

(71) Applicant: Intel Corporation, Santa Clara, CA (US)

(72) Inventors: Yingern Ho, Bayan Lepas (MY); Hao-Han Hsu, Portland, OR (US); Boon Ping Koh, Seberang Jaya (MY)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/987,782

(22) Filed: Nov. 15, 2022

(65) Prior Publication Data

US 2023/0074049 A1 Mar. 9, 2023

(51) Int. Cl.
*H04L 25/03* (2006.01)
*H04L 25/02* (2006.01)

(52) U.S. Cl.
CPC .... *H04L 25/03006* (2013.01); *H04L 25/0272* (2013.01)

(58) Field of Classification Search
CPC ........... H04L 25/03006; H04L 25/0272; H04L 25/4902; H04L 25/0278; H05K 1/0245; H05K 1/025; H04B 1/1027

USPC ......................................................... 375/262
See application file for complete search history.

(56) References Cited

U.S. PATENT DOCUMENTS

| | | | | |
|---|---|---|---|---|
| 2009/0188711 A1* | 7/2009 | Ahmad | ................ | H05K 1/0248 |
| | | | | 174/262 |
| 2015/0370954 A1* | 12/2015 | Shen | ..................... | G06F 30/394 |
| | | | | 716/126 |

* cited by examiner

*Primary Examiner* — Fitwi Y Hailegiorgis
(74) *Attorney, Agent, or Firm* — Compass IP Law PC

(57) ABSTRACT

Differential signal skew compensation techniques for radio frequency interference (RFI) mitigation with no reflection penalty and associated apparatus and methods. A differential pair of signal traces are formed on or in a PCB having at least two changes in direction, with a first signal trace having a first routing path defining a first length and a second signal trace adjacent to the first signal trace including one or more tuning structures that are configured such that the length of the second signal trace matches the first length. Segments of the first signal trace adjacent to the one or more tuning structures of the second signal trace are widened relative to other segments of the first signal trace. The tuning structures may comprise sawtooth structures, accordion structures and other serpentine or meander structures. The solution mitigates RFI without a reflection penalty.

20 Claims, 11 Drawing Sheets

Longer Routing

Shorter Routing

Substantially Matched
Routing Length

Widened

Substantially Matched
Routing Length

DIFFERENTIAL SIGNAL SKEW COMPENSATION TECHNIQUE FOR RFI MITIGATION WITH NO REFLECTION PENALTY

BACKGROUND INFORMATION

Length mismatch causes skew between the differential pair of signals and thus may significantly increase common mode noise that is prone to much higher radiation to nearby system integrated antenna. High radio frequency interference (RFI) level impacts end user experience. As shown in FIG. 1, Every 1 dB increment in broadband RFI will degrade Wi-Fi™ (IEEE 802.11x) throughput by 3.3%; and 2.4% throughput drop per dB by narrowband RFI.

Impedance mismatch and discontinuity in differential signals routing results in higher reflection. Reflection may increase inter-symbol interference (ISI) and greatly reduce eye height/width. Differential signals using pulse-width modulation such as STEP PHY can be very sensitive to the reflection.

Current approaches to mitigating length mismatch and imprudence mismatch include on-board EMI (electromagnetic interference) shielding, stripline routing (instead of microstrip routing). And skew compensation with meander routing. On-board EMI shielding increases costs, Z-height, and requires additional footprint. Stripline routing increases costs and increase printed circuit board (PCB) thickness. Slew compensation with meander routing results in increased reflection.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1:
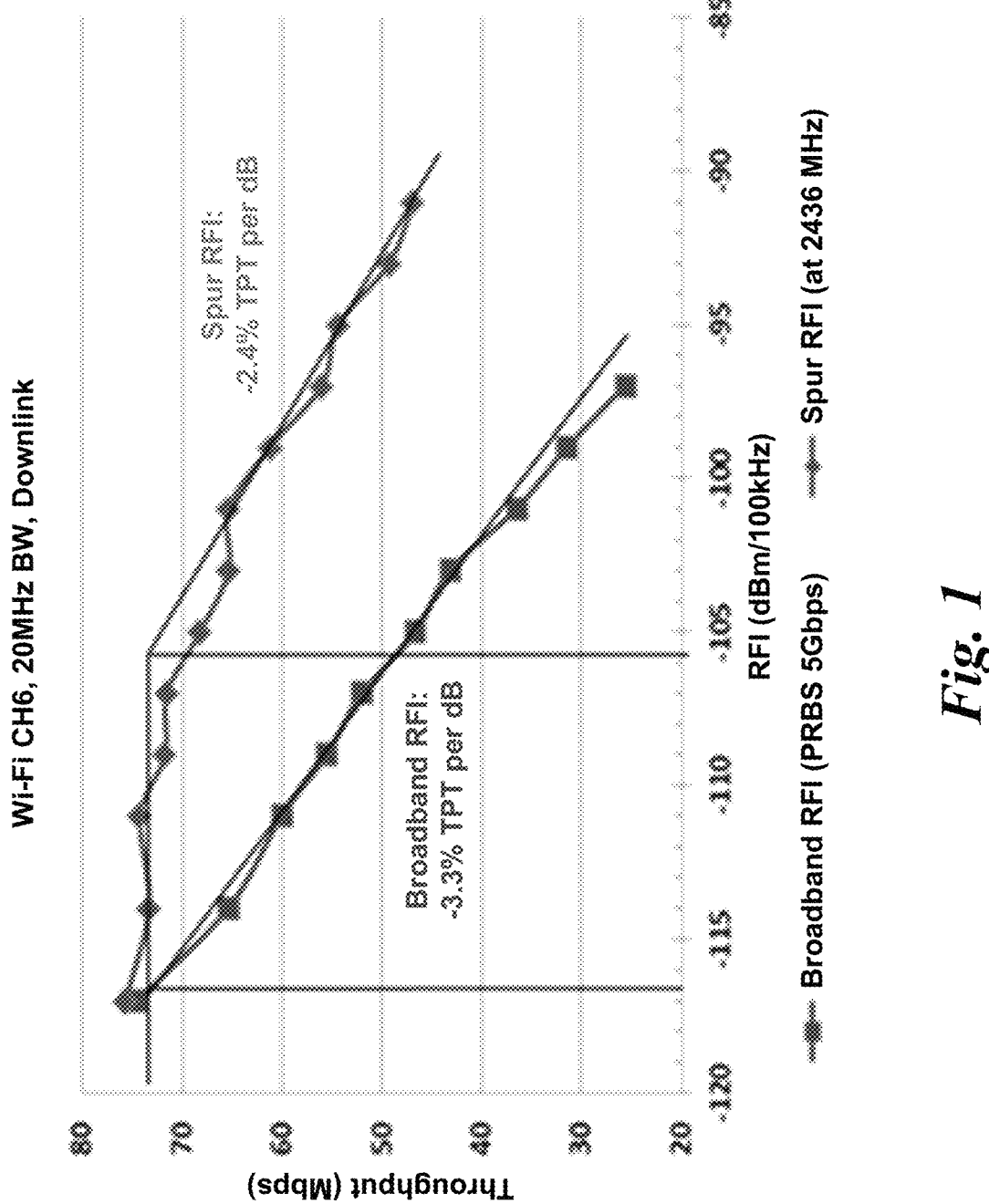
FIG. 1 is a plot of Spur RFI and Broadband RFI as a function of throughput.

Embodiments of differential signal skew compensation techniques for RFI Mitigation with no reflection penalty and associated apparatus and methods are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

In accordance with aspects of the embodiments disclosed herein, apparatus and methods for improving impedance discontinuity of meander-type skew-compensation by selectively widening one of the transmission lines proximate to a meandering portion of the other transmission line. The technique smooths impedance of the meander section and reduces reflection, while minimizing skew and radiation. As a result, radio performance can be maintained without signal integrity penalty.

Figure 2:
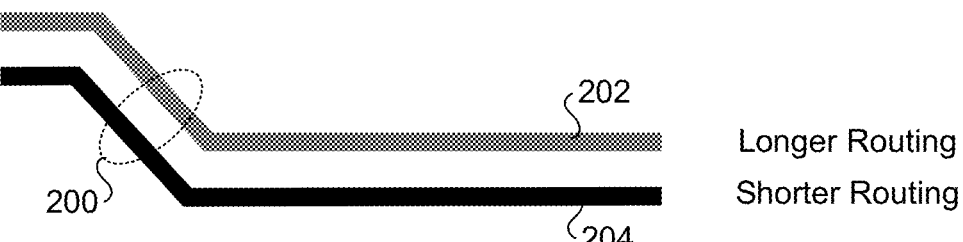
FIG. 2 is a diagram illustrating a first conventional approach for routing differential pair traces.

FIG. 2 shows a portion of the trace routing for a differential pair 200 comprising PCB traces 202 and 204 using a first conventional approach. As illustrated, the routing length of trace 202 is longer than the routing length of trace 204. The routing length mismatch causes skew between the differential pair of signals and may significantly increase common mode noise that is prone to much higher radiation to nearby system integrated antenna.

Figure 3:
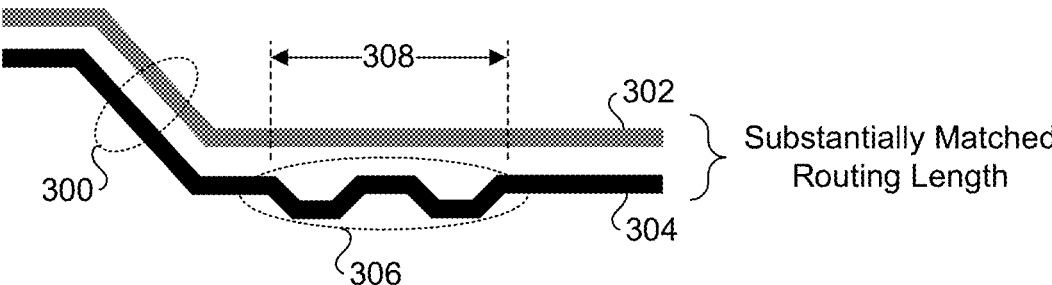
FIG. 3 is a diagram illustrating a second conventional approach for routing differential pair traces.

FIG. 3 shows a portion of the routing for a differential pair 300 comprising PCB traces 302 and 304 using a second conventional approach using a tuning structure comprising a "sawtooth" structure, which may also be referred to as a "sawtooth serpentine" structure in the art. Tuning structures, such as sawtooth structures, serpentine structures, accordion structures, meander structures, and trombone structures are used to alter the signal path length such that the signal path lengths for a differential pair of signals substantially match. As illustrated, trace 304 includes a sawtooth structure 306 over a span 308 that has been added to substantially match the routing path lengths for traces 302 and 304. While this addresses the length mismatch issue, sawtooth structure 306 causes impedance mismatch and discontinuity in differential signal routing, which results in higher reflection. Reflection may increase inter-symbol interference (ISI) and greatly reduce eye height/width.

Figure 4:
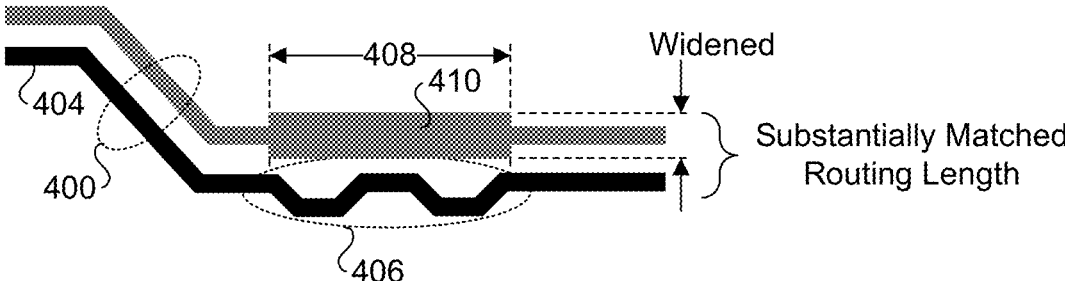
FIG. 4 is a diagram illustrating an embodiment of the solution for routing differential pair traces employing a sawtooth structure.

FIG. 4 depicts an embodiment of a differential pair 400 comprising PCB traces 402 and 404. Trace 404 includes a sawtooth structure 406 over a span 408. Trace 402 includes a widened section 410 over span 408. Sawtooth structure 406 minimizes the skew and RFI risk from differential pair due to length mismatch, while the wider routing along span 408 of sawtooth structure 406 smooths the impedance at the sawtooth structure and therefore reduces the reflection.

Figure 5:
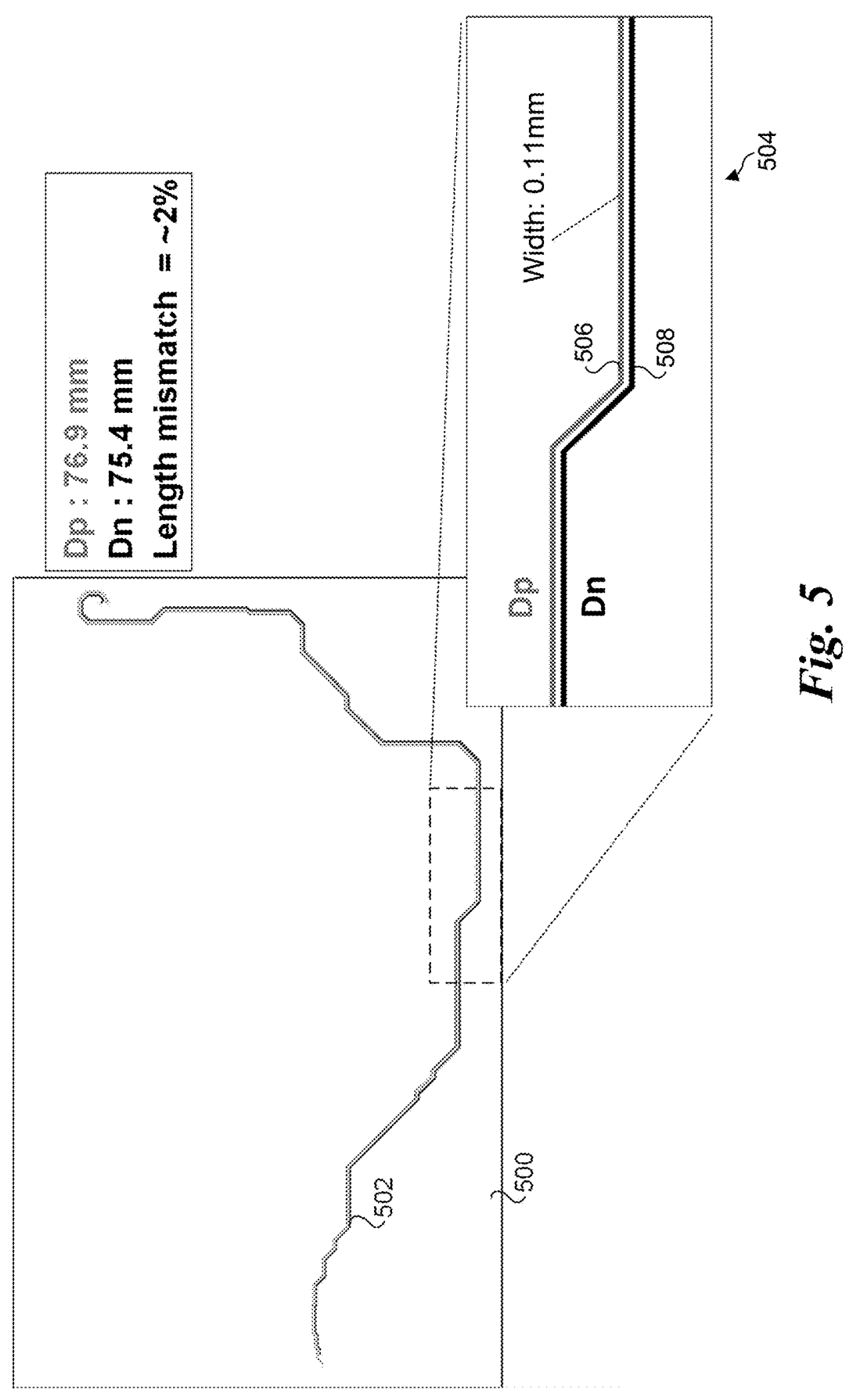
FIG. 5 is a diagram illustrating differential pair trace routing on a PCB using the first conventional approach of FIG. 2.

The foregoing examples in FIGS. 2, 3, and 4 illustrate small portions of the PCB traces used for routing a differential pair of signals. In practice, the full routing path may include more changes in direction. For example, FIG. 5 shows a PCB 500 including a pair of traces 502 for routing a differential pair of signals using the first conventional approach. It is common practice to label a differential pair of signals as p' and 'n' or (as shown here) 'Dp' and 'Dn'. As shown in the blowup section 504, traces 502 include a Dp trace 506 and a Dn trace 508, both having a width of 0.11 mm in this example. As further shown by the legend, the length of Dp trace 506 is 76.9 mm while the length of Dn trace 508 is 75.4 mm, which result in a length mismatch of approximately 2%.

Figure 6:
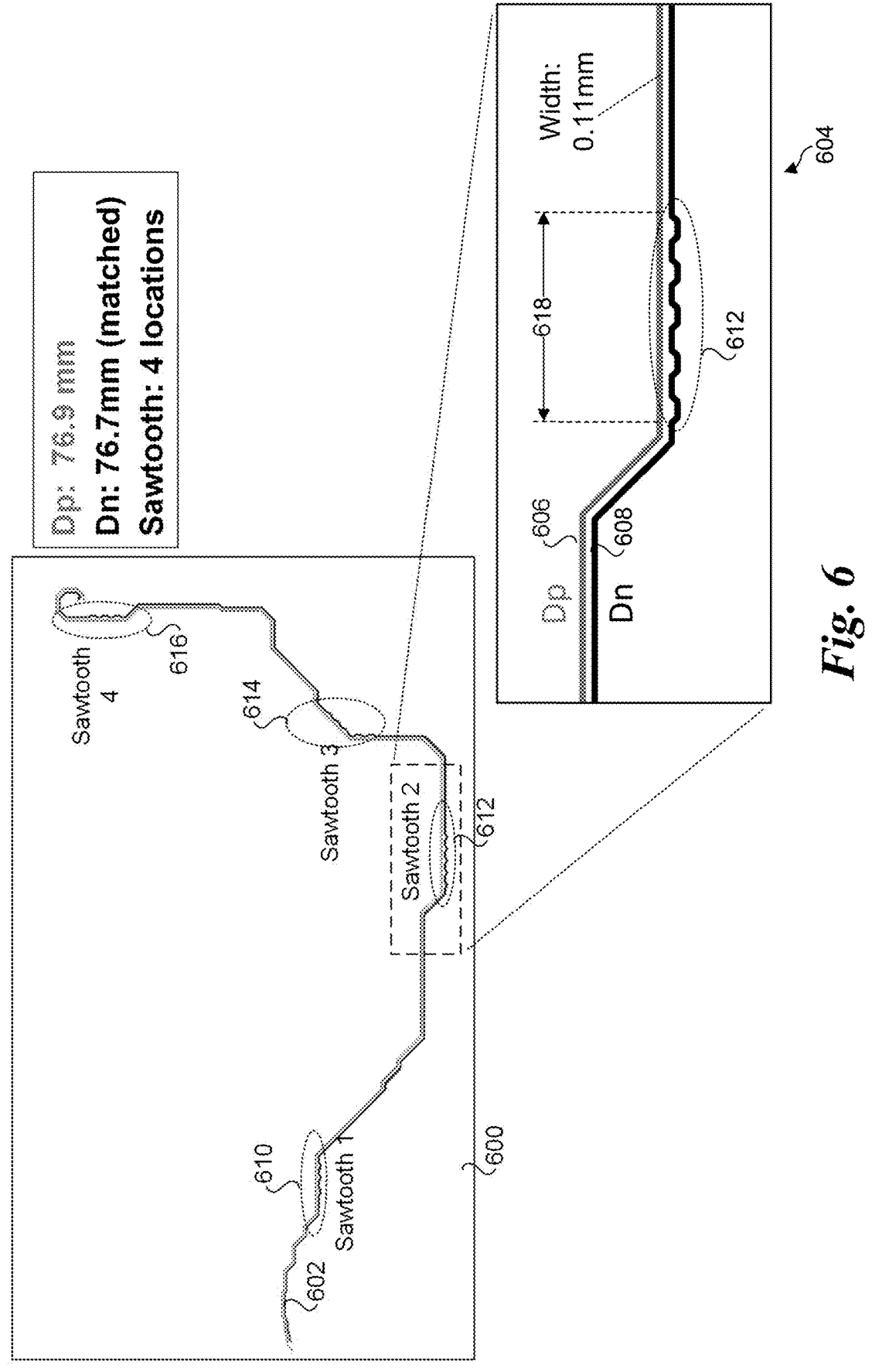
FIG. 6 is a diagram illustrating differential pair trace routing on a PCB using the second conventional approach of FIG. 3.

FIG. 6 shows a PCB 600 including a pair of traces 602 for routing a differential pair of signals using the second conventional approach. As shown in the blowup section 604, traces 602 include a Dp trace 606 and a Dn trace 608, both having a width of 0.11 mm in this example. As also shown, the routing path of traces 602 includes four sawtooth structures 610, 612, 614, and 616. Sawtooth structure 612 has a span 618; likewise, each of sawtooth structures 610, 614, and 616 would have a respective span. As further shown by the legend, the length of Dp trace 606 is 76.9 mm while the length of Dn trace 608 is 76.7 mm, which substantially matches the Dp trace length.

Figure 7:
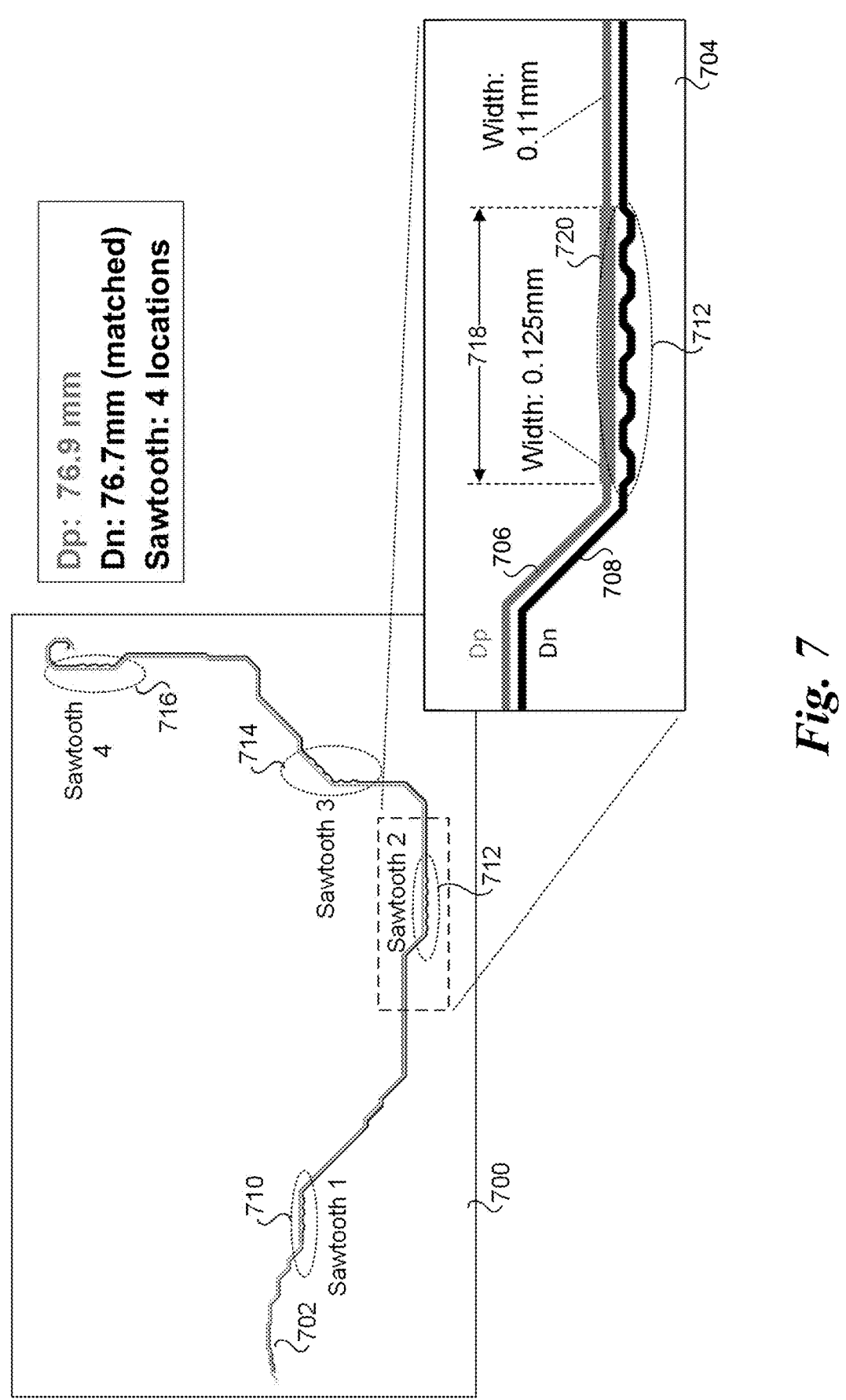
FIG. 7 is a diagram illustrating differential pair trace routing on a PCB using the embodiment of the solution approach of FIG. 4.

FIG. 7 shows a PCB 700 including a pair of traces 702 for routing a differential pair of signals under an embodiment of the solution. As shown in the blowup section 704, traces 702 include a Dp trace 706 and a Dn trace 708, both having a width of 0.11 mm in this example. As also shown, the routing path of traces 702 includes four sawtooth structures 710, 712, 714, and 716, which are the same as sawtooth structures 610, 612, 614, and 616 for Dp trace 606. As in FIG. 6 and shown by the legend, the length of Dp trace 706 is 76.9 mm while the length of Dn trace 708 is 76.7 mm, which substantially matches the Dp trace length.

The basic structures of the differential pair traces are similar to those shown in FIG. 4, with a widened section opposite the span of each sawtooth structure. Accordingly, as further shown in blowup section 704, Dp trace 706 includes a widened section 720 that spans the span 718 of sawtooth structure 712; likewise, the sections for Dp trace 706 opposite the spans of sawtooth structures 710, 714, and 716 would have a respective widened section. In this example, the width of the widened sections is 0.125 mm.

Figure 8:
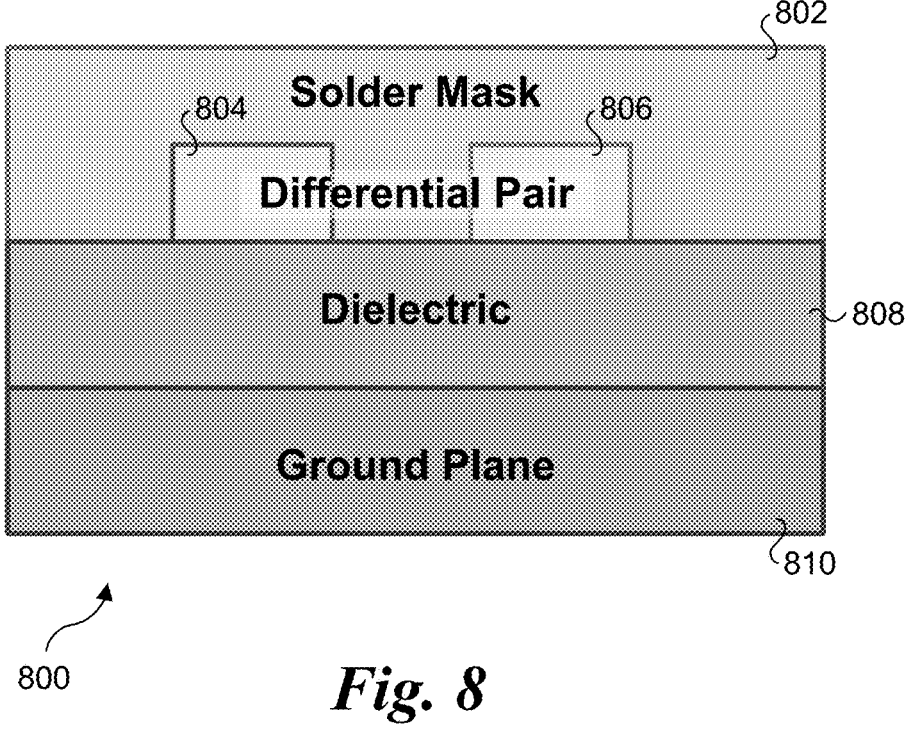
FIG. 8 shows a cross-section view of a PCB structure.

FIG. 8 shows a PCB structure 800 illustrating a cross-section of a PCB with a differential pair of trace. The PCB structure includes a solder mask 802, a differential pair of traces 804 and 806, a dielectric layer 808, and a ground plane 810. In other embodiments, the PCB cross-section may include more layer with routing traces separated by dielectric layers. Routing traces in the different layers would be connected by vias or the like.

Simulation of RFI Characteristics

The effectiveness of the solution as applied to Wi-Fi RFI reduction and SI performance is demonstrated using ANSYS HFSS 3D simulation. 3D simulation models corresponding to the first and second conventional designs shown and FIGS. 5 and 6 and an embodiment of the solution shown in FIG. 7 were constructed in HFSS for comparison purpose.

To study the SI performance of the three cases, a frequency sweep from 0 Hz to 50 GHz is set. Time Domain Reflectometer (TDR) plots for these three cases were then generated and analyzed.

Figure 9:
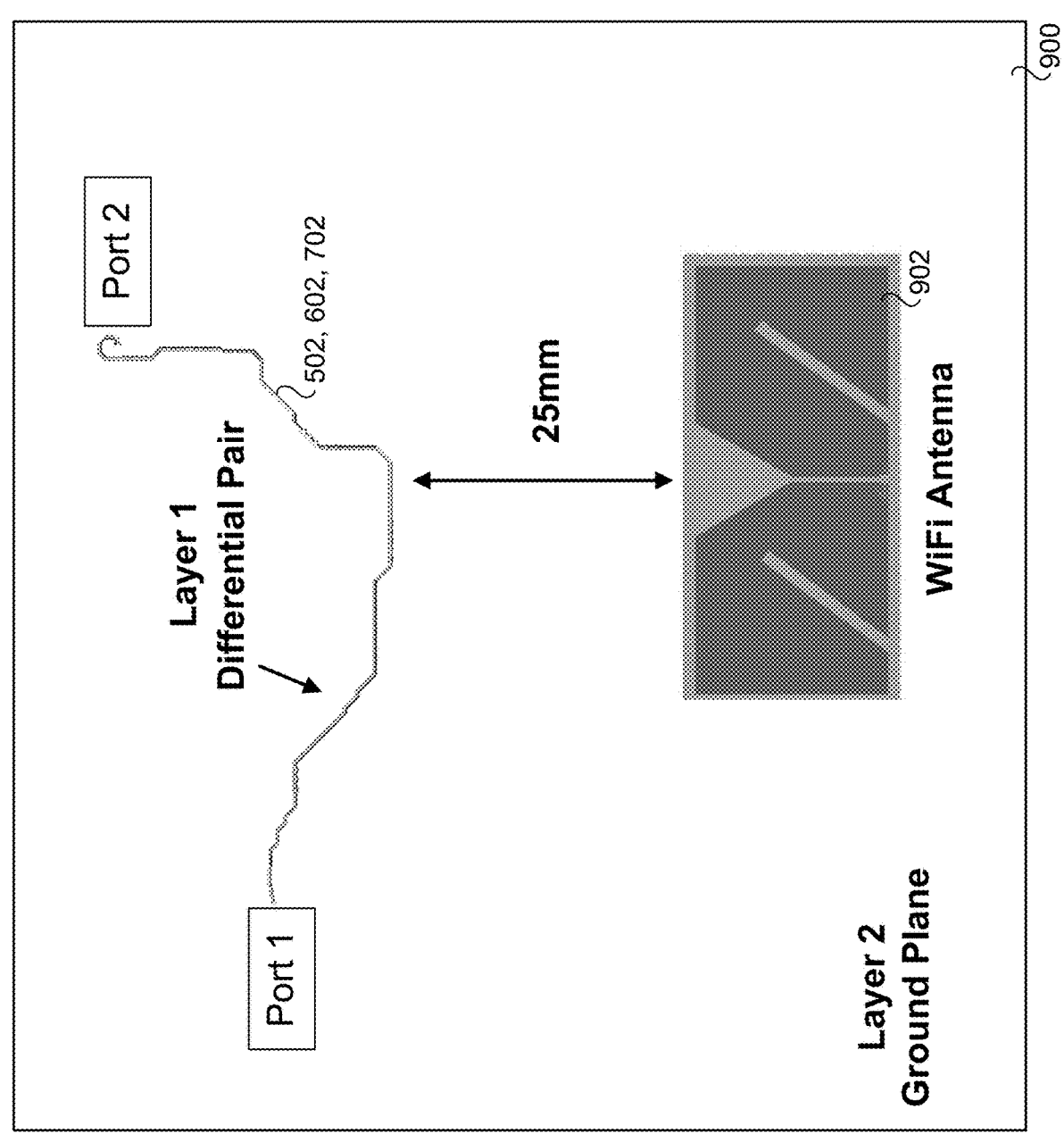
FIG. 9 is a diagram illustrating an apparatus configuration that was modeled using ANSYS HFSS 3D simulation to compare RFI and SI performance.

To study the impact of RFI of the three cases, a Wi-Fi antenna is located 25 mm away from the differential pair to measure noise level that propagates from the differential pair to the antenna, as shown in FIG. 9. For respective models, pairs of signal traces 502, 602, and 702 for routing differential signals corresponding to FIGS. 5, 6, and 7 are deposited in a first layer (Layer 1) of a PCB 900. The pairs of signal traces couple signals between a pair of differential ports (Port 1 and Port 2). A Wi-Fi antenna 902 is mounted to the PCB approximately 25 mm from signal traces 502, 602, and 702, as shown. The second layer (Layer 2) of PCB 900 is a ground plane, with the PCB structure being similar to that shown in FIG. 8.

The 25 mm distance between the Wi-Fi antenna and the noise source was considered as a worst-case scenario in a form factor design. Note that the stack-ups of the design and the location of signal traces for the differential pair remained unchanged for three cases. A Frequency sweep of 0 Hz to 7 GHz was set. Antenna coupling to differential Port 1 and Port 2 2 S-parameter is compared between the three cases.

Figures 10, 11:
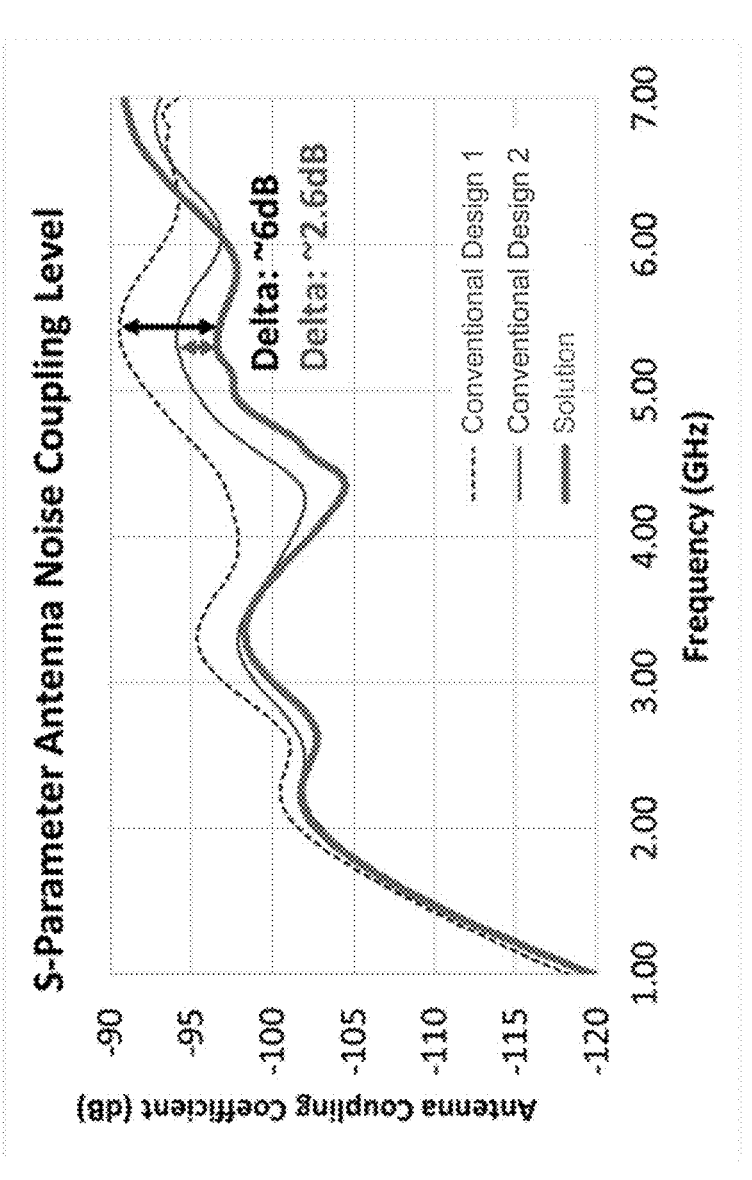
FIG. 10 is a plot depicting S-parameter antenna noise coupling coefficient comparison between the first and second conventional designs and an embodiment of the solution design using the model of FIG. 9.
FIG. 11 shows a TDR plot comparison between the first and second conventional designs of FIGS. 5 and 6 and the solution of FIG. 7 using the model of FIG. 9.

FIG. 10 depicts S-parameter antenna noise coupling coefficient comparison between the first and second conventional designs of FIGS. 5 and 6 and the embodiment of the solution from 1 GHz to 7 GHz obtained from ANSYS HFSS 3D Layout simulation. The result ascertains that by having both sawtooth structure and wider routing width (from 0.11 mm to 0.125 mm) at adjacent differential signal traces could suppress RFI risk level up to 6 dB compared to conventional design land up to 2.6 dB RFI reduction compared to conventional design 2. Conventional design 1 has a 2% length mismatch between the differential pair signal path lengths and therefore has the highest antenna to noise coupling level. Conventional design 2 with added sawtooth structures ensure the differential pair signal path length is well match, and it reduces Wi-Fi RFI level up to 3 dB compared to conventional design 1. However, a reflection issue can be seen in conventional design 2. Similar to conventional design 2, the differential pair signal path length in the embodiment of the solution is well matched with the implementation of sawtooth structures. By widening the routing of the adjacent trace along the span of the sawtooth structure, this provides an additional 2.6 dB RFI suppression compared to conventional design 2.

FIG. 11 shows a TDR plot comparison between the first and second conventional designs of FIGS. 5 and 6 and the design implemented by the embodiment of the solution in FIG. 7 using the ANSYS HFSS 3D simulation from 0 GHz to 50 GHz. The result shows reflection occurs when only sawtooth structures are implemented in the differential pair design of FIG. 6. However, by widening the differential signal trace 706 adjacent to spans of the sawtooth structures of signal trace 708, differential pair impedance is well matched and there is no signal integrity issue. Comparing to conventional design 2 (FIGS. 3 and 6) to the solution (FIGS. 4 and 7), up to 3 ohm differential pair impedance mismatch correction is achieved. Impedance at the jogged section is adjusted from 80 ohm to 77 ohm.

Figure 12:
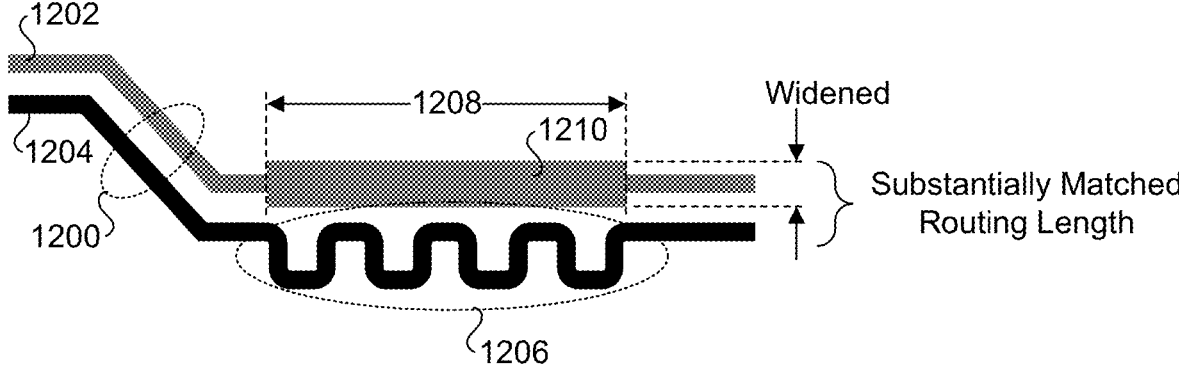
FIG. 12 is a diagram illustrating an embodiment of the solution for routing differential pair traces employing an accordion structure.

In addition to sawtooth structures, other types of tuning structures may be used. An example of another tuning structure comprises an "accordion" structure is shown in FIG. 12. Generally, an accordion structure is a type of serpentine or meander routing, which also includes "trombone" structures, with the primary difference between accordion and trombone structures is a trombone structure is offset to the side (or below) the signal trace rather than inline with the signal trace.

FIG. 12 depicts an embodiment of a differential pair 1200 comprises PCB traces 1202 and 1204. Trace 1204 includes an accordion structure 1206 over a span 1208. Trace 1202 includes a widened section 1210 over span 1208. As with other types of tuning structures, accordion structure 1206 minimizes the skew and RFI risk from differential pair due to length mismatch, while the wider routing along span 1208 of sawtooth structure 1206 smooths the impedance at the accordion structure and therefore reduces the reflection.

In the accordion structure illustrated in FIG. 12, the height and width of the loops are similar. However, this is merely exemplary and non-limiting. In some cases, the height of the loops may be substantially more than the width of the loops. In addition, some loops may have different heights than other loops.

In addition to single differential pairs, the principles and teachings herein may be applied to multi-lane links employing multiple differential pairs. For example, PCIe is an example of a multi-lane link, wherein a given PCIe link may employ link widths of x1, x2, x4, x8, and x16 (where 'x' precedes the number of lanes, with each lane comprising a differential pair). As another example, high-speed Ethernet links may employ two or more lanes, with each lane comprising a differential pair.

Figure 13:
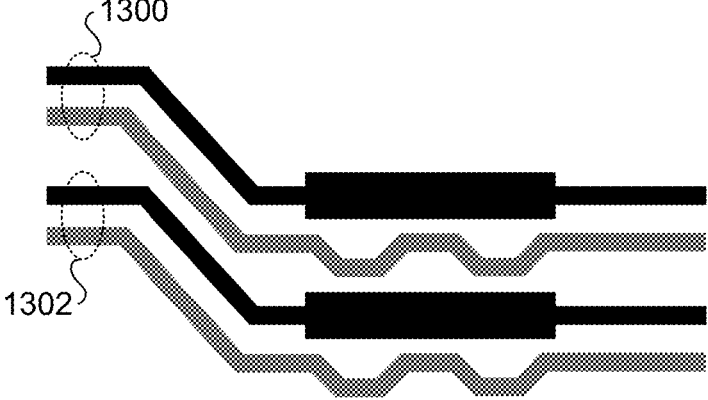
FIG. 13 is a diagram illustrating two pair of differential signal traces employing sawtooth structures.

A simplified example of signal trace routing employing two differential pair 1300 and 1302 is shown in FIG. 13. Generally, the tuning structures of the traces may be replicated (as shown), or the location of some tuning structures may different along different portions of the signal traces.

Computer Platform/System Architectures

Figure 14:
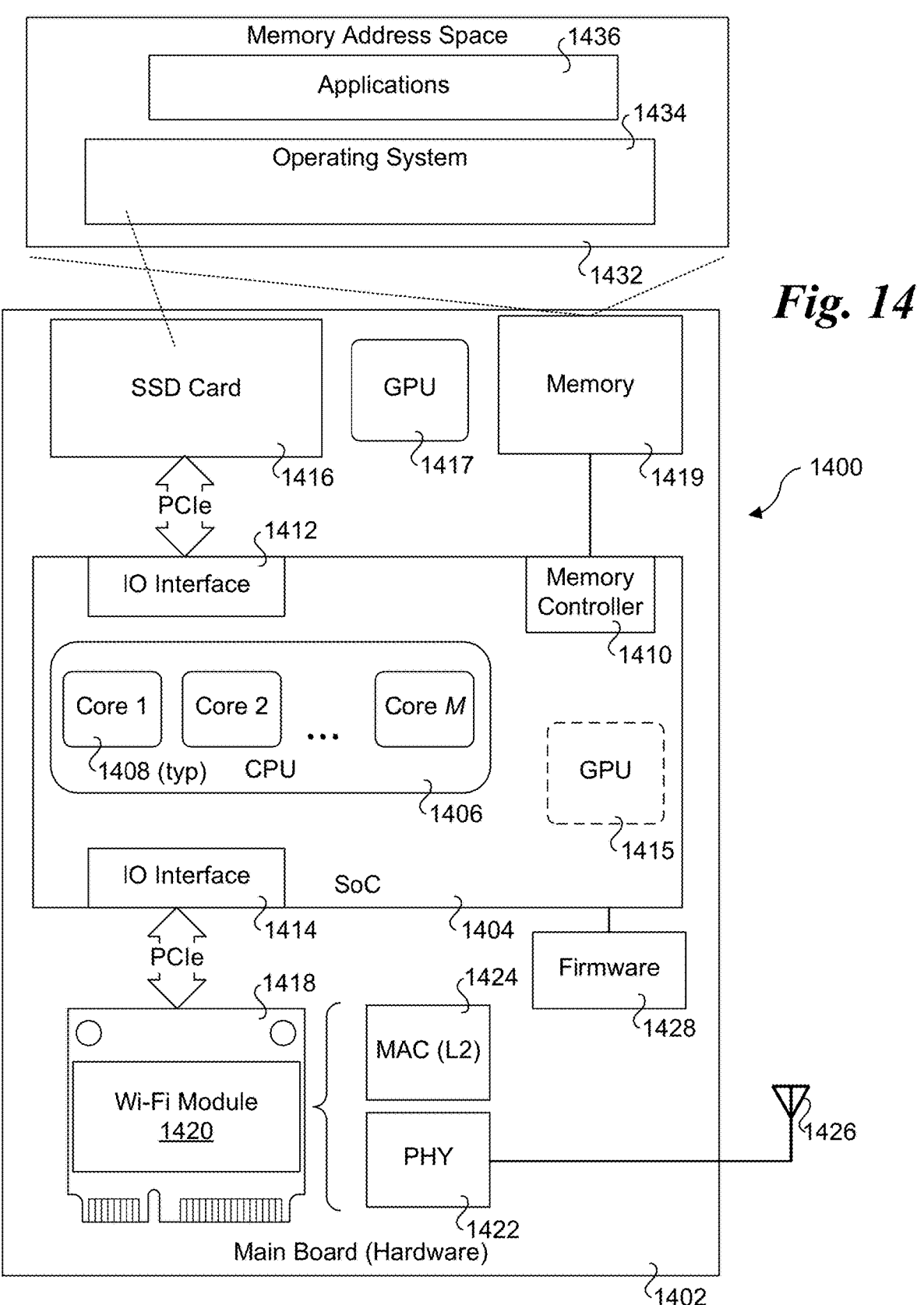
FIG. 14 is a schematic diagram illustrating a first computer platform architecture that may employ the differential pair routing solutions described and illustrated herein.

Non-limiting examples of computer platform or system architectures are shown for a laptop, notebook, desktop, server, or all-in-one computer in which one or more differential pair of signals may be routed in accordance with embodiments herein are shown in FIG. 14. Under platform architecture 1400, the computer platform/system includes hardware 1402 comprising a main board to which a processor System on Chip (SoC) 1404 is mounted (e.g., via flip-chip bonding, socketed, or any other mounting technique). Processor SoC 1404 includes a central processing unit (CPU) 1406 having M processor cores 1408, where M is an integer such as 4, 6, 8, 10, 12 . . . etc. In this example, the processor cores are depicted as to appear the same for simplicity. An SoC may include more than one type of processor core, such as a combination of higher performance cores that consume relatively more power and lower performance cores that consume relatively less power. Generally, CPU 1406 may employ various types of architectures including but not limited to x86 architectures and ARA/OD-based cores, RISC, etc., including a mixture of core architectures. Processor SoC 1404 further includes a memory controller 1410 and a pair of Input-Output (10) interfaces. In addition to the components shown, processor SoC 1404 would generally include a cache hierarchy and various levels of interconnects that are not shown for simplicity and to reduce clutter. For example, each processor core 1408 may include a Level 1 (L1) and Level 2 (L2) cache, while the SoC may include a Last Level Cache (LLC) that is shared among the processor cores.

In some embodiments processor SoC 1404 includes a Graphics Processor Unit (GPU) 1415, while in other embodiments a GPU 1417 that is external to the processor SoC is employed, such as deployed in a graphics card or the like. A processor SoC may also include a myriad of other component, such as power-related components, and management components that are also not shown.

Hardware 1402 further includes a solid-state disk (SSD) card 1416, a wireless card 1418, and memory 1419. SSD card employs a type of non-volatile memory, such as a type of Flash memory, NVRAM, etc. In one embodiment, SSD card is a mini-PCIe (Peripheral Component Interconnect Express) card and is connected via a PCIe interconnect/bus to IO interface 1412. Other interconnect structures and protocols may also be used, with the use of PCIe in the figures herein being merely exemplary and non-limiting.

Wireless card 1418 is depicted as a mini-PCIe card or PCIe M.2 card including a Wi-Fi module 1420 that includes suitable circuitry and logic for implementing one or more IEEE 802.11 standards. The circuitry and logic include circuitry for implement a Physical Layer (PHY) 1422 and a Media Access Control Layer (MAC) 1424. The MAC layer is Layer 2 for both Wi-Fi and Ethernet-based network interfaces. PHY 1422 is connected to an antenna 1426. Antenna 1426 may be external (or at the edge) of the housing of the computer platform or may be integrated in Wi-Fi module 1420. Wi-Fi module 1420 may also provide other types of wireless support, such as BLUETOOTH®.

Hardware 1402 also includes one or more firmware storage devices 1428 in which system firmware instructions are stored. The firmware instructions are used to boot the platform and provide run-time support for accessing various platform functionality, as is known in the art.

Memory 1419 is physically implemented as one or more DRAM (Dynamic Random Access Memory) devices or modules, such as DRAM DIMMS (Dual Inline Memory Modules). Memory 1419 and memory controller 1410 comprise a memory subsystem that may be compatible with various memory technologies, such as DDR4 (Double Data Rate version 4, initial specification published in September 2012 by JEDEC (Joint Electronic Device Engineering Council)). DDR4E (DDR version 4), LPDDR3 (Low Power DDR version3, JESD209-3B, August 2013 by JEDEC), LPDDR4 (LPDDR version 4, JESD209-4, originally published by JEDEC in August 2014), WIO2 (Wide Input/Output version 2, JESD229-2 originally published by JEDEC in August 2014), HBM (High Bandwidth Memory, JESD325, originally published by JEDEC in October 2013), DDR5 (DDR version 5), LPDDR5, HBM2E, HBM3, and HBM-PIM, or others or combinations of memory technologies, and technologies based on derivatives or extensions of such specifications. The JEDEC standards are available at www.jedec.org.

The physical memory on the memory devices/modules are mapped into a memory address space 1432 into which software is loaded for execution. This includes an operating system 1434 and one or more applications 1436. Generally, the software loaded into memory address space 1432 may be stored on SSD card 1416 or loaded via a network once the platform has booted. The computer platform/system will also load system firmware into a protected region in memory address space 1432 to facilitate booting the platform and also to be used for run-time operations.

A power source (not depicted) provides power to the components of hardware 1402. The power source generally interfaces to one or multiple power supplies in the computer to provide power to the components of the computer platform. In one example, the power supply includes an AC to DC (alternating current to direct current) adapter to plug into a wall outlet. In one example, the power source can include an internal battery in combination with an, alternating current supply.

Generally, main board 1402 will comprise a PCB with various signal traces deposited on one or more layers and vias used to interconnect some of the traces. As discussed above, the PCB my also include a ground plane or the like—the size and configuration of the ground plane may vary depending on platform requirements and the like. A portion of the signal traces will comprise traces for routing differential pairs of signals in accordance with one or more embodiments described and illustrated herein and discussed above.

Exemplary Mobile Device

Figure 15:
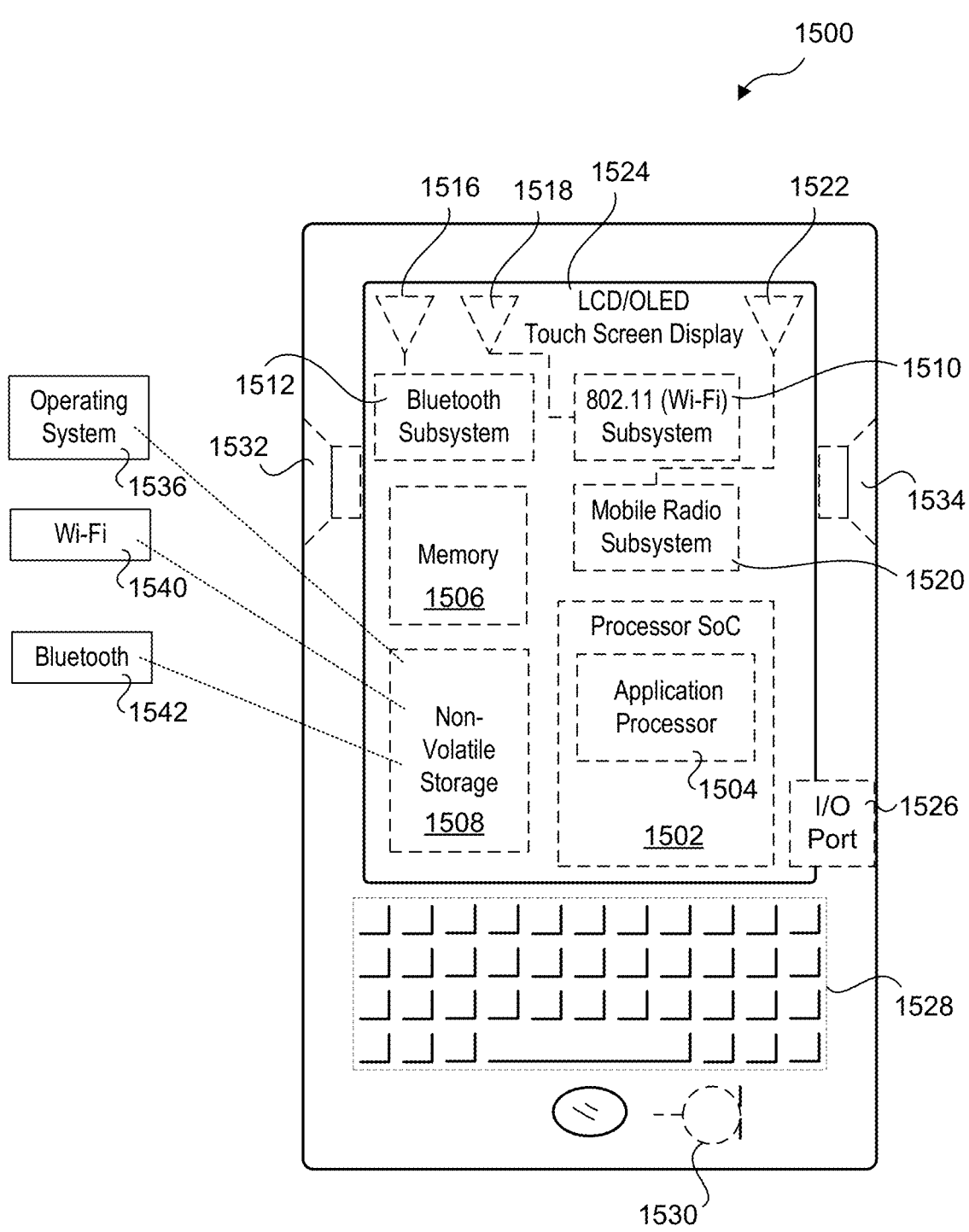
FIG. 15 is a schematic diagram of an exemplary mobile device that may employ the differential pair routing solutions described and illustrated herein.

The principles and teachings disclosed herein for routing differential pair traces may also be used in mobile devices. An example mobile device 1500 is shown in FIG. 15. Mobile device 1500 is generally illustrative of a variety of types of mobile devices, including mobile phones, tablets, laptop computers, notebooks, Chromebooks, media players, and any other type of mobile device that may include a Wi-Fi radio subsystem and a low energy radio subsystem, such as but not limited to BLUETOOTH® low energy.

Mobile device 1500 includes a processor SoC 1502 including an application processor 1504 that includes one or more cores. Processor SoC 1502 is operatively coupled to each of memory 1506, non-volatile storage 1508, an IEEE 802.11 (Wi-Fi) subsystem 1510, and a BLUETOOTH® sub-system 1512, the latter two of which are coupled to a respective antenna 1516 and 1518. If mobile device 1500 comprises a mobile phone, or otherwise is a mobile device that includes facilities for accessing a mobile network, mobile device 1500 further includes a mobile radio subsystem 1520 coupled to an antenna 1522. It is noted that the functions of two or more of antennae 1516, 1518, and 1522 may be implemented with a single antenna in some embodiments.

In embodiments under which mobile device 1500 is a mobile phone or tablet, mobile device 1500 includes a display screen 1524 comprising a liquid crystal display (LCD) screen, or other type of display screen such as an organic light emitting diode (OLED) display. Display screen 1524 may be configured as a touch screen though use of capacitive, resistive, or another type of touch screen technology. Mobile device 1500 further includes an I/O port 1526, a virtual or physical keyboard 1528, a microphone 1530, and a pair of speakers 1532 and 1534.

During operation, software instructions and modules comprising an operating system 1536, a Wi-Fi module 1540, and a BLUETOOTH® module 1542 are loaded from non-volatile storage 1508 into memory 1506 for execution on an applicable processing element (e.g., a core) on processor SoC 1502. For example, these software components and modules, as well as other software instructions are stored in non-volatile storage 1508, which may comprise any type of non-volatile storage device, such as Flash memory. In addition to software instructions, a portion of the instructions for facilitating various operations and functions herein may comprise firmware instructions that are stored in non-volatile storage 1508 or another non-volatile storage device (not shown).

Generally, operating system 1536 may comprise any existing or future operating system, including but not limited to APPLE® iOS™, GOOGLE® ANDROID™ MICROSOFT® WINDOWS™ and WINDOWS PHONE™, BLACKBERRY® OS or QNS operating systems, and various flavors of Linux operating systems.

Wi-Fi module 1540 includes instructions for configuring Wi-Fi subsystem 1510 and facilitating communication sessions using Wi-Fi connections with Wi-Fi access points. This includes applicable 802.11 network stack layers, in addition to application layer software. Similarly, BLUETOOTH® module 1542 includes instructions for configuring BLUETOOTH® radio subsystem 1512, including applicable BLUETOOTH® network stack layers and application layer software.

Processor SoC 1502, memory 1506, non-volatile storage 1508 802.11 subsystem 1510 BLUETOOTH® subsystem 1512 and mobile radio subsystem 1520 will generally comprise a chip, module, or package that is mounted to a main PCB (not shown). Various signal traces will be deposited on one or more layers of the main PCB and vias are used to interconnect some of the traces. As before, the PCB my also include a ground plane or the like. A portion of the signal traces will comprise traces for routing differential pairs of signals in accordance with one or more embodiments described and illustrated herein and discussed above.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. An apparatus, comprising:
a printed circuit board (PCB) including a first differential pair of signal traces formed on or in the PCB having at least two changes in direction, the first differential pair of signal traces comprising,
a first signal trace having a first routing path defining a first length; and
a second signal trace adjacent to the first signal trace, including one or more tuning structures that are configured such that a second length of the second signal trace matches the first length,
wherein a segment of the first signal trace adjacent to a span of a tuning structure of the second signal trace is widened relative to other segments of the first signal trace.

2. The apparatus of claim 1, further comprising radio frequency (RF) circuitry disposed on the PCB and located proximate a portion of the differential pair of signals.

3. The apparatus of claim 2, wherein the RF circuitry comprises an integrated circuit chip or module with an integrated antenna.

4. The apparatus of claim 2, wherein the RF circuitry comprises circuitry configured to support an Institute of Electrical and Electronics Engineers (IEEE) 802.11 standard.

5. The apparatus of claim 1, further comprising at least a second differential pair of signal traces formed on or in the PCB adjacent to the first differential pair of signal traces, wherein each addition differential pair of signal traces comprises,
a first signal trace having a first routing path defining a first length; and
a second signal trace adjacent to the first signal trace, including at least one tuning structure that is configured such that a second length of the second signal trace matches the first length,
wherein a segment of the first signal trace adjacent a span of a tuning structure of the second signal trace is widened relative to other segments of the first signal trace.

6. The apparatus of claim 1, wherein the first differential pair of signal traces is configured to route signals having a frequency of at least 1 Gigahertz.

7. The apparatus of claim 1, wherein the first differential pair of signal traces comprise microstrips and the one or more tuning structures comprise a sawtooth structure, accordion structure, serpentine structure, or meander structure.

8. The apparatus of claim 1, wherein at least one of the first and second signal traces include multiple tuning structures, and wherein segments of signal traces adjacent to spans of the tuning structures in one of the signal traces are widened in the other signal trace.

9. A method for routing signal traces on or in a printed circuit board (PCB), comprising:
routing a first trace comprising a first signal path for a first signal in a first differential pair of signals;
routing a second trace adjacent to the first trace, the second trace comprising a second signal path for a second signal in the first differential pair of signals,
wherein the first and second traces have at least two changes in direction, and wherein at least one of the first and second traces have at least one tuning structure configured such that signal path lengths of the first and second traces are substantially equal, and wherein a section of the signal path for a trace that is adjacent to a tuning structure of an adjacent trace is widened relative to other segments of that trace.

10. The method of claim 9, wherein the PCB has radio frequency (RF) circuitry disposed thereon, and wherein routing of the first and second traces reduce radio frequency interference (RFI) with the RF circuitry.

11. The method of claim 10, wherein the RF circuitry comprises an integrated circuit chip or module with an integrated antenna.

12. The method of claim 11, wherein the integrated circuit chip or module comprises an Institute of Electrical and Electronics Engineers (IEEE) 802.11 chip or module with an integrated antenna.

13. The method of claim 9, further comprising:
routing at least a second differential pair of signal traces formed on or in the PCB adjacent to the first differential pair of signal traces, wherein each addition differential pair of signal traces comprises,
a first signal trace having a first routing path defining a first length; and a second signal trace adjacent to the first signal trace, having a tuning structure that is configured such that a second length of the second signal trace matches the first length, wherein a segment of the first signal trace adjacent to a span for the tuning structure of the second signal trace is widened relative to other segments of the first signal trace.

14. The method of claim 9, wherein each of the first and second signal traces include at least one tuning structure, and wherein segments of signal traces adjacent to tuning structures of another signal trace are widened.

15. The method of claim 9, wherein the signal traces comprise microstrips, and a bottom layer of the PCB comprises a solid metal plane.

16. A computing device, comprising:

a processor;

at least one memory device;

a radio frequency (RF) chip or module;

an RF antenna, attached to the RF chip or module or integrated thereon; and a printed circuit board (PCB) to which the processor, the at least one memory device, and the RF chip or module are mounted or operatively coupled, including, a first differential pair of signal traces formed on or in the PCB having at least two changes in direction comprising, a first signal trace having a first routing path defining a first length; and a second signal trace adjacent to the first signal trace, including one or more tuning structures that are configured such that a second length of the second signal trace matches the first length, wherein a segment or segments of the first signal trace adjacent to a span or spans of the one or more tuning structures of the second signal trace is or are widened relative to other segments of the first signal trace.

17. The computing device of claim 16, wherein the RF chip or module comprises circuitry configured to support an Institute of Electrical and Electronics Engineers (IEEE) 802.11 standard.

18. The computing device of claim 16, wherein each of the first and second signal traces include at least one tuning structure, and wherein segments of signal traces adjacent to tuning structures in one of the signal traces are widened in the other signal trace.

19. The computing device of claim 16, wherein the computing devices comprises a laptop, notebook, Chromebook, mobile phone, or tablet.

20. The computing device of claim 16, wherein the computing devices comprises a desktop computer, an all-in-one computer, or a server.

\* \* \* \* \*